(12) United States Patent
VanDenBerghe

(10) Patent No.: US 10,384,362 B2
(45) Date of Patent: *Aug. 20, 2019

(54) TAPE SYSTEM WITH A LONGITUDINAL FILAMENT FOR SLITTING FILM

(71) Applicant: 3M INNOVATIVE PROPERTIES COMPANY, St. Paul, MN (US)

(72) Inventor: Garry Cyrille Alfred VanDenBerghe, Coldstream (CA)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 16 days.

This patent is subject to a terminal disclaimer.

(21) Appl. No.: 15/672,705

(22) Filed: Aug. 9, 2017

(65) Prior Publication Data

US 2017/0334085 A1    Nov. 23, 2017

Related U.S. Application Data

(63) Continuation of application No. 14/612,479, filed on Feb. 3, 2015, now Pat. No. 9,751,232.

(51) Int. Cl.
| | |
|---|---|
| B26D 1/547 | (2006.01) |
| B23B 27/08 | (2006.01) |
| B32B 7/06 | (2019.01) |
| B32B 7/12 | (2006.01) |
| B32B 27/30 | (2006.01) |
| B32B 27/08 | (2006.01) |
| C09J 7/29 | (2018.01) |
| B32B 3/08 | (2006.01) |

(Continued)

(52) U.S. Cl.
CPC .............. *B26D 1/5475* (2013.01); *B32B 3/08* (2013.01); *B32B 7/06* (2013.01); *B32B 7/12* (2013.01); *B32B 27/08* (2013.01); *B32B 27/304* (2013.01); *C09J 7/29* (2018.01); *B32B 2405/00* (2013.01); *B32B 2571/00* (2013.01); *C08K 7/04* (2013.01); *C08K 7/06* (2013.01); *C09J 2205/102* (2013.01); *Y10T 156/1052* (2015.01); *Y10T 428/26* (2015.01); *Y10T 428/2839* (2015.01)

(58) Field of Classification Search
CPC ......... B32B 7/06; B32B 27/08; B32B 27/304; B32B 7/12; B26D 1/5475
See application file for complete search history.

(56) References Cited

U.S. PATENT DOCUMENTS

| | | |
|---|---|---|
| 2,005,665 A | 6/1935 | Saignier |
| 2,771,385 A | 11/1956 | Humphner |
| 3,810,813 A | 5/1974 | Ellis |

(Continued)

FOREIGN PATENT DOCUMENTS

| | | |
|---|---|---|
| CA | 2860576 | 4/2014 |
| CN | 1784780 A | 6/2006 |
| WO | WO 2002026395 | 4/2002 |

*Primary Examiner* — Mark A Osele
*Assistant Examiner* — Christopher C Caillouet
(74) *Attorney, Agent, or Firm* — Daniel J. Iden

(57) ABSTRACT

A vehicle is wrapped by an adhesive film which is then slit by applying first tape to the vehicle having a longitudinally extending filament carried by the tape at a position spaced from the side edges. A second tape is applied over the film at the first tape body so as to bridge to each side of the filament and pulling the filament so as to tear through the film and the first ad second tapes body with the second tape applying a force to the film acting to reduce tendency of the film to pull away from the object during the cutting by the filament as the filament is pulled.

20 Claims, 1 Drawing Sheet

(51) Int. Cl.
　　　*C08K 7/04*　　　(2006.01)
　　　*C08K 7/06*　　　(2006.01)

(56) References Cited

U.S. PATENT DOCUMENTS

| | | |
|---|---|---|
| 4,255,469 A | 3/1981 | McGinness |
| 5,054,618 A | 10/1991 | Kim |
| 6,025,045 A | 2/2000 | Langeman |
| 6,235,365 B1 | 5/2001 | Schaughency |
| 6,875,469 B2 | 4/2005 | Langeman |
| 7,014,900 B2 | 3/2006 | Langeman |
| 7,314,312 B2 | 1/2008 | Soderholm |
| 7,550,187 B2 | 6/2009 | Seth |
| 7,914,638 B2 | 3/2011 | VanDenBerghe |
| 8,187,407 B2 | 5/2012 | VanDenBerghe |
| 8,361,615 B2 | 1/2013 | VanDenBerghe |
| 2006/0266464 A1 | 11/2006 | White |
| 2007/0284046 A1 | 12/2007 | Habisreitinger |
| 2008/0092483 A1 | 4/2008 | Osgood |
| 2009/0074994 A1 | 3/2009 | McLean |

…

TAPE SYSTEM WITH A LONGITUDINAL FILAMENT FOR SLITTING FILM

CROSS REFERENCE TO RELATED APPLICATIONS

This application is a continuation of U.S. patent application Ser. No. 14/612,479, filed Feb. 3, 2014, now allowed, the disclosure of which is incorporated by reference in their entirety herein.

BACKGROUND OF THE INVENTION

Popular customization of vehicles in some cases involves the application of an adhesive film to the exterior surface of the vehicle. Such a film is readily available and is provided in sheets carrying a pressure sensitive adhesive covered by a release layer.

While the present application mentions specifically vehicles as an area where such films are used, it will be appreciated that many other uses of such self-adhesive films can be contemplated and are within the ambit of the present invention.

Some films are arranged to be printed with a required graphics to be applied to the vehicle and a number of patents of the present applicant describe the slitting of such films.

Another type of film which is often applied to vehicles is known as stone guard which applies a hard coating to the vehicle surface to prevent stone chips.

One issue which remains a difficulty is that of cutting the film at required locations so that the film terminates at the edge of a panel or at any other required location on the vehicle.

The Patents of the present Applicant provide an arrangement which satisfactorily cuts or slits the graphics film and has been widely adopted as a system for use in this field.

Some films such as the stone guard type product are more difficult to apply and are more difficult to slit when applied. Often these use a wetted surface of the vehicle to assist the application and to improve the adhesion when applied, but this makes slitting of the film more difficult so that the slit formed by a filament fails to provide the required clean effective cuts and can leave unacceptable jagged edges.

SUMMARY OF THE INVENTION

It is one object of the invention to provide a tape system for slitting film.

According to the invention there is provided a tape system for cutting a film comprising:

a first tape body of an extensible material having a front surface, a rear surface, a first longitudinal side edge and a second longitudinal side edge;

the first tape body having an adhesive on the rear surface for attachment to an object;

the front surface of the first tape body being free from adhesive and having a release characteristic relative to pressure sensitive adhesive such that the pressure sensitive adhesive can be contacted onto the front surface of the tape and pulled away;

the first tape body having a longitudinally extending filament carried thereby;

a second tape body of an extensible material having a front surface, a rear surface, a second longitudinal side edge and a second longitudinal side edge;

the second tape body having an adhesive on the rear surface for attachment to the film when applied over the first tape body;

the second tape body having a width arranged such that the second tape body when applied over the film at the first tape body bridges to each side of the filament on the first tape body underneath the film;

wherein the filament and the second tape body are arranged such that the filament when pulled tears through the second tape body along the length of the second tape body at its position at the second tape body spaced from both side edges.

Preferably the filament comprises a metal wire which is as fine as possible to provide the best cutting action and therefore has preferably a diameter less than 0.005 inch or in the range 0.0025 to 0.005 inch.

Preferably the filament is attached to the first tape body at a position thereon spaced from both the first and second side edges which allows bending of the first tape body while the first tape body remains flat in a first side to side direction by extension of the first tape body along the second longitudinal side edge relative to the filament and to the first longitudinal side edge and in a second side to side direction by extension of the tape along the first longitudinal side edge relative to the filament and to the second longitudinal side edge. However the filament can be pulled from one edge provided it slits through the second tape which must bridge either side of the filament to hold the film down.

Thus preferably the filament and the first tape body are arranged such that, with the rear surface of the first tape body attached to the object, the filament when pulled tears through the first tape body along the length of the first tape body at its position on the first tape body spaced from both side edges rather than pulling out from one side edge of the tape body.

Preferably each tape body has a width less than 0.25 inches with the first tape often being as narrow as 0.125 inch and the second tape being wider and commonly as much as 0.25 inch.

Preferably the first tape body carries a single filament which is all that is required in this preferred method. However for other uses more than one filament can be included.

Preferably the filament is located in the adhesive on the rear surface. However as an alternative structure, the first tape body may have a first substrate layer overlying and laminated by an adhesive to a second substrate layer where the longitudinally extending filament is located between the first and second substrate layers.

Preferably the first and second tape bodies are formed of the same material which is of a character which allows the material to slit easily when the filament is pulled through.

Preferably the second tape body has a length so that an end thereof extends beyond the first tape body and a start edge of the film to engage the object and hold the film onto the object when the slitting action is started at one edge.

According to a second aspect of the invention there is provided a method for cutting a film when applied by an adhesive to an object comprising:

applying first tape body to the object;

the first tape body comprising an extensible material having a front surface, a rear surface, a first longitudinal side edge and a second longitudinal side edge;

the first tape body having an adhesive on the rear surface for attachment to the object;

the front surface of the first tape body being free from adhesive and having a release characteristic relative to the adhesive;

the first tape body having a longitudinally extending filament carried thereby;

applying a second tape body over the film at the first tape body so as to bridge to each side of the filament of the first tape body underneath the film;

the second tape body comprising an extensible material having a front surface, a rear surface, a second longitudinal side edge and a second longitudinal side edge;

the second tape body having an adhesive on the rear surface for attachment to the film;

and pulling the filament so as to tear through the film and the second tape body along the length of the second tape body at its position on the second tape body spaced from both side edges.

In this arrangement preferably the second tape body applies a force to the film acting to reduce tendency of the film to pull away from the object during the cutting by the filament as the filament is pulled. This reduces the tendency of the film to bunch up as the filament is pulled. Such bunching increases the loading on the filament temporarily which can cause it to break. While a very fine wire filament of less than 0.005 inch and preferably less than 0.003 inch is preferred to provide the best cutting action, this can only be used if the loads on the filament do not temporarily reach a level where the filament can break. Thus without the use of this hold down system, the filament must be thicker to tolerate the loads and the thicker filament reduces the quality of the cut line and leads to higher cutting forces.

The second tape tends to retain the film flat against the surface of the object so that the very fine filament acts to tear right at the surface without any ability to move side to side relative to the intended cut line on the film which can cause jagged side edges to the slit.

This method is particularly applicable to a film of the type such as stone guard films which are typically applied with an application of water to the object. This water temporarily reduces the tack of the adhesive allowing the film to be applied while being stretched and moved as required to be tailored to the contours of the surface. As the water is removed or dries out, the adhesive increases in action to apply a strong retention force necessary in the area where the stone guard film is applied. However this reduction in the tack of the adhesive of the film allows it to lift from the surface during the slitting action Preferably the second tape body is laid so as to extend beyond an end of the first tape body and an edge of the film to engage the object and hold the film onto the object during the start of the cutting action.

According to a further aspect of the invention there is provided a method for cutting a film when applied by an adhesive to an object comprising:

applying tape body to the object;

the tape body comprising an extensible material having a front surface, a rear surface, a first longitudinal side edge and a second longitudinal side edge;

the tape body having an adhesive on the rear surface for attachment to the object;

the front surface of the tape body being free from adhesive and having a release characteristic relative to the adhesive;

pulling the filament so as to tear through the film;

and applying a force to the film acting to reduce tendency of the film to pull away from the object during the cutting by the filament as the filament is pulled.

In some preferred arrangements the filament is arranged at a distance from both side edges which allows bending of the tape while the tape remains flat in a first side to side direction by extension of the tape along the second longitudinal side edge relative to the filament and to the first longitudinal side edge and in a second side to side direction by extension of the tape along the first longitudinal side edge relative to the filament and to the second longitudinal side edge. However a tape with the filament attached at one edge can also be used In this arrangement preferably the filament and the tape body are arranged such that, with the rear surface of the second substrate layer attached to the object, the filament when pulled tears through the first substrate layer of the tape body along the length of the tape body at its position on the tape body spaced from both side edges so as to leave on one side of the position a first portion of the first substrate layer including the first side edge which remains attached to the second substrate layer and so as to leave on an opposite side of the position a second portion of the first substrate layer including the second side edge which remains attached to the second substrate layer, rather than pulling out from one side edge of the tape body.

Typically the adhesive on the tape has the characteristic that the tape body can be pulled from a surface of the object without leaving an adhesive residue and without damaging the surface.

The filament is carried in or on the adhesive on the rear surface. In this case, the adhesive is arranged to hold the filament in place on the tape during bending of the tape while the tape is applied to the surface and while the filament is being pulled to effect the cutting of the film. In this case, the filament when carried on the adhesive has a coating material compatible with the adhesive for generating an improved adhesion between the filament and the adhesive.

In an alternative arrangement, the adhesive is applied onto the substrate over the filament to hold the filament against the surface of the substrate.

As the filament is spaced from the first and second side edges and the tape has a width arranged such that the filament tears through the tape along the length of the tape, when pulled to cut the film, rather than pulling from one side edge of the tape, the tearing of the tape leaves a portion of the tape along the first side edge underneath the edge of the film which is removed after the film is cut and the edge laid flat on the surface. In this case, preferably the tape is colored to visually distinguish the portion of the tape from the film.

In some cases a primer is applied to the surface at least underneath the tape for increased attachment of the edge of the film to the surface and the adhesive of the tape preferably has the characteristic that the tape can be pulled from the primer on the surface of the object without leaving a residue of the adhesive and without damaging the primer surface.

Preferably the tape is formed of a plastics material allowing stretch of the tape greater than that of the filament. Preferably the tape is formed of a PVC. Preferably the pressure sensitive adhesive on the tape is rubber based as this can provide the required properties of adhesion and subsequent removal of the tape.

Preferably the tape carries a release coating on the front surface having a release characteristic relative to the pressure sensitive adhesive on the film such that the pressure sensitive adhesive on the film can be contacted onto the front surface of the tape and pulled away for repositioning without dislodging the tape from the object.

The tape can be used in a method which can include printing onto a second opposed surface of the film a pattern to be wrapped onto the object so as to apply the pattern around a part of the object and over the panel.

The tape can be used in a method which can be used to apply various types of film such as vinyl to vehicles. This can include large sheets or panels which are used to wrap or can include stripe packages that also require cutting. Some vehicles have reflective vinyl striping down both sides, so the stripe must be cut around the wheel wells, door handles and the like. Pinstripes on cars, trucks etc, also require cutting and again this application would alleviate the use of a knife. All applications can be done using various types of vinyl, perhaps printed or unprinted.

The tape may include a substrate with the adhesive applied to one surface of the substrate, or the tape may comprise simply an adhesive material with the filament attached thereto or embedded therein.

The filament can be formed of any suitable material which has sufficient strength to carry out the cutting action when pulled without breaking and a sufficient cutting action to effect cutting and not tearing the film. Metal wire is typically suitable. Other materials such as carbon fiber or Kevlar fiber can be used.

Preferably the tape has a width less than 0.25 inches so that the bare piece or strip at the edge of the panel and at the edge of the adjacent portion is as narrow as possible.

The absence of adhesive on the front surface of the tape can be used to allow the film position to be adjusted on the panel and on the object so that it is properly placed and located without creases or folds or bubbles while aligning printed images from different sheets as required. Thus the pressure sensitive adhesive on the film itself is used to attach the film to all locations and the release coating is of a character that the film can be pulled back and re-located when required without dislodging the tape from the object.

Films of this type are available with a release layer from suppliers such as 3M and can be printed with the pattern at the place of application using designs supplied by a customer.

The object is typically a vehicle or boat or other transportation device including automobiles, vans, buses and the like. In this case the panel is typically a door or trunk lid.

The area to be left uncovered can be any area of a surface of the object such as a door handle, gas filler cap or the like. In this case the whole surface of the vehicle or other object is to be covered but includes such areas which cannot be covered without interfering with the operation.

However other objects can be covered where the problem of doors or other panels and the problem of areas to be left uncovered is to be resolved using the above invention. The film typically wraps around at least a side of the vehicle where the hinged panel is a door and around a rear of the vehicle where a second hinged panel is provided and covered using the invention.

BRIEF DESCRIPTION OF THE DRAWINGS

One embodiment of the invention will now be described in conjunction with the accompanying drawings in which.

DETAILED DESCRIPTION

The method of the present invention uses the tape and concepts disclosed in for example U.S. Pat. No. 8,361,615 issued Jan. 29, 2013 and assigned to the present Applicant, the disclosures of which are incorporated herein by reference or may be referenced for further details of the tape and concepts.

In that patent shown a vehicle, such as a panel van, including a side panel with a door and a rear panel and including hinged panel 14 in the form of a pair of rear doors 14A and 14B.

It is intended that a film should be wrapped around the vehicles to cover parts of the vehicle, particularly where stone chips may occur. The film can be supplied as a single sheet but typically will be formed in smaller sheets which are butted edge to edge or slightly overlapping to cover as much of the vehicle as is required.

The vehicle includes a number of hinged panels such as doors, trunk lid and hood which can move from a closed position in which an edge of the panel abuts an adjacent edge portion of the vehicle.

Typically as the sheet is supplied in flat form and the vehicle surface is extensively contoured, it is necessary to pull and stretch the film to fit the surface. This typically includes, in extreme locations, the application of heat from a heat gun to the sheet 18 and generally includes the repeated steps of pulling the sheet, applying it temporarily over the surface, removing the sheet for further pulling and reapplying the sheet until it is applied in a contour fit condition against the vehicle with no bubbles.

Figure 1:
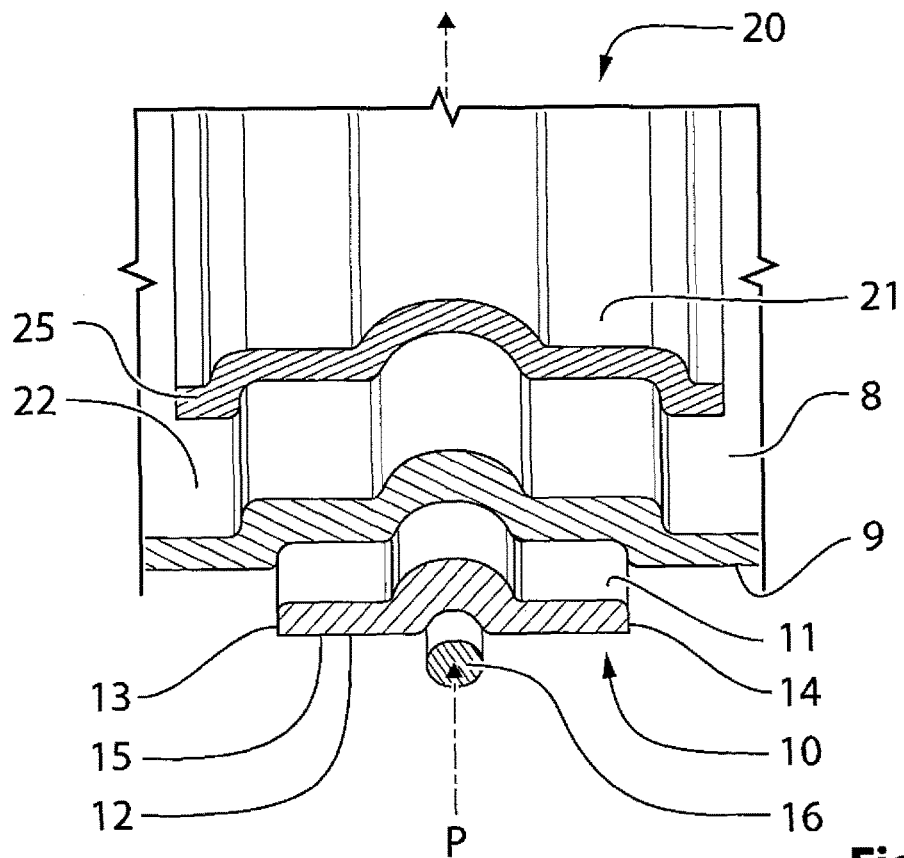
FIG. 1 is a cross sectional view through one embodiments of tape system for use in the present invention.

In order to effect cutting of the film at the edges and there is provided a tape 10 shown in FIG. 1 having a front surface 11, a rear surface 12, a first longitudinal side edge 13 and a second longitudinal side edge 14. The tape has an adhesive layer 15 on the rear surface 12 for attachment to the object. The tape 10 is free from adhesive on the front surface 11 which instead has a release characteristic allowing it to release from or to repel adhesive such as the adhesive 9 on the sheet 8. This release characteristic is typically provided by an actual coating but can be provided by the characteristics of the substrate itself or by a co-extruded layer on the substrate. The release coating is not intended to be removed and is not therefore a removable peel away sheet. The tape 10 carries a filament 16.

The filament 16 can be located along one longitudinal side edge 13 or 14 but preferably is located along a line part way or mid way across the tape spaced from both the first and second longitudinal side edges.

In FIG. 1, the filament is simply applied onto the adhesive layer 15 and is attached thereto. Thus the filament can be simply attached to a pre-existing tape. Typically the thickness of the tape base or substrate and the adhesive is of the order of 0.002 to 0.005 inches and the diameter of the filament is of the order of 0.0025 to 0.005 inches so that the filament stands up from the adhesive and is not buried or implanted in the adhesive material. However the selection of the adhesive and the filament is such that it remains attached during the step of the method up to the pulling of the tape to cut the film.

The adhesive may be applied after the filament is laid on the tape substrate and thus covers over the filament providing an enhanced attachment where required.

The filament may carry a pre-applied adhesive or primer material which cooperates with the adhesive 35 providing an enhanced attachment where required.

An alternative construction can be provided which includes two substrate layers and laminated together by a laminating adhesive with the filament 16 captured between the layers and thus held in place. The layer carries on its rear surface the adhesive and the layer carries on its front surface the release coat. The laminating adhesive has to be such that it allows the filament to release from it. The filament could be treated to prevent becoming fixed to the adhesive if say the laminating adhesive was the cross linkable type. This is not an issue if pressure sensitive adhesive is used for the laminating adhesive.

The tape has a width in the range 0.060 to 0.500 inches and is preferably less than 0.25 inches.

The tape is extensible to a degree so as to allow bending to at least one side by extension along the opposite side. Thus the tape can bend to each side through any angle to take up a minimum inside radius of curvature of the order of 0.157 inches. This allows it to be bent or wrapped around elements on the vehicle such as door handles and other items previously described while the tape remains flat against the vehicle surface and attached to the vehicle surface by its layer of adhesive.

As shown the filament is spaced from both side edges to allow bending in both directions. As the filament is located in the middle as shown, the tape is symmetrical and will bend equally in each direction. Typically the filament is less extendible than the tape since longitudinal extension of the filament in the longitudinal direction is undesirable during the pulling action.

The adhesive thus acts to hold the filament in place on the tape during bending of the tape while the tape is applied to the surface and while the filament is being pulled to effect the cutting of the film.

The tape is formed of a plastics or filmic material allowing stretch of the tape greater than that of the filament and preferably the tape is formed of a PVC which has been found to provide the best characteristics of strength, co-operation with film adhesive, elongation and clean cutting of the film.

The arrangement of the present invention provides a tape system for cutting a film which includes the first tape 10 and the filament 16. The arrangement further provides a second tape 20 formed by a body of an extensible material having a front surface 21, a rear surface 22, a first longitudinal side edge 23 and a second longitudinal side edge 24. The second tape body has an adhesive 25 on the rear surface 22 for attachment to the film when applied over the first tape body so that the second tape body. The second tape body has a width greater than that of the first tape arranged such that the second tape body when applied over the film at the first tape body bridges to each side of the filament on the first tape body underneath the film. The film forming the second tape is arranged such that the filament when pulled tears through the second tape body along the length of the second tape body at its position at the second tape body spaced from both side edges. This has been found to provide an effective clean cutting action on the film with little or no jagged edges and little or no pulling of the film which can cause bunching.

As explained above, the filament 16 is attached to the first tape 10 at a position thereon spaced from both the first and second side edges which allows bending of the first tape body as indicated at 101, 102 while the first tape body remains flat in a first side to side direction by extension of the first tape body along the second longitudinal side edge relative to the filament and to the first longitudinal side edge and in a second side to side direction by extension of the tape along the first longitudinal side edge relative to the filament and to the second longitudinal side edge.

As explained previously, the filament 16 and the first tape 10 are arranged such that, with the rear surface of the first tape body attached to the object, the filament when pulled as indicated at P tears through the first tape body along the length of the first tape body at its position on the first tape body spaced from both side edges rather than pulling out from one side edge of the tape body.

As shown in FIG. 1, the filament 16 is located in the adhesive 12 on the rear surface of the tape 10. The adhesive is thus arranged to hold the filament in place on the first tape body during bending of the first tape body while the first tape body is applied to the surface and while the filament is being pulled to tear through the first tape body. As an alternative (not shown) the first tape body has a first substrate layer overlying and laminated by an adhesive to a second substrate layer and the longitudinally extending filament is located between the first and second substrate layers. This acts to better locate the filament and hold it in place.

In an alternative (not shown) the filament 16 is attached to the first tape 10 body at one of said first and second side edges.

Figure 2:
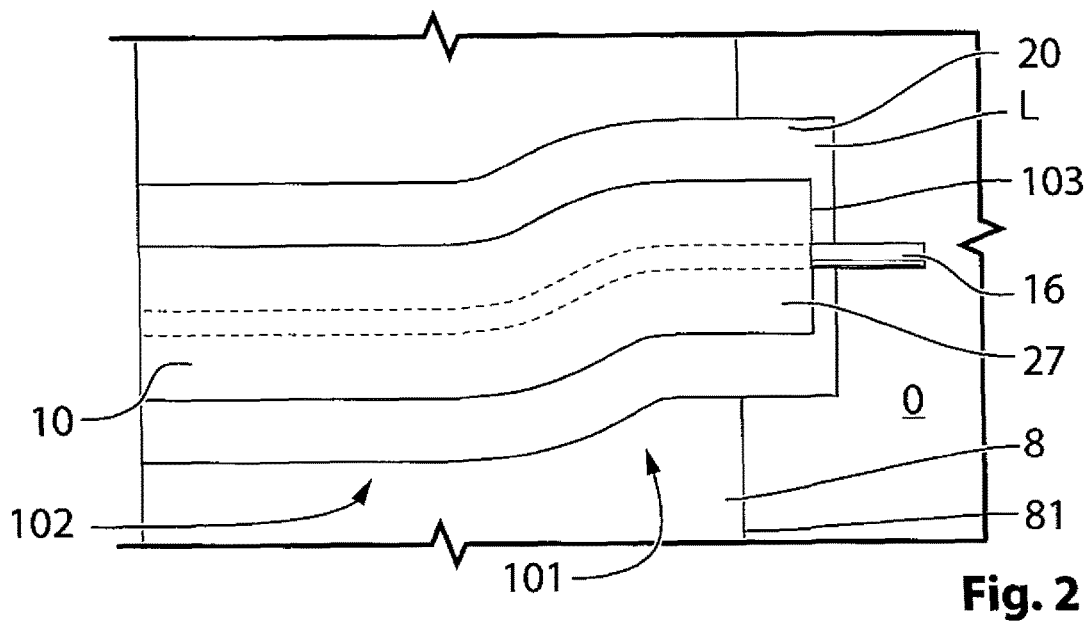
FIG. 2 is a front elevational view of a surface of an object to be covered vehicle showing film and the two tapes of the system.

As shown in FIG. 2, the second tape 20 has a length L so that an end 27 extends beyond the end 103 of the first tape 10 and beyond an edge 81 of the film 8 to engage the object and hold the film onto the object O.

The second tape 20 thus acts to apply a force to the film acting to reduce tendency of the film to pull away from the object during the cutting by the filament as the filament is pulled. It is also possible to apply the force by different methods such as by pressing an object such as a roller onto the film at the location where the pulling force P is applied

The invention claimed is:

1. A tape system for cutting a film comprising:
a first tape body of an extensible material having a front surface, a rear surface, a first longitudinal side edge and a second longitudinal side edge, the first tape body comprising a first and a second substrate;
the first substrate layer overlaying the second substrate, and laminated by an adhesive to the second substrate;
the first tape body having a longitudinally extending filament laminated between the first and second substrates and carried thereby; the first tape body having an adhesive on the rear surface for attachment to an object;
the front surface of the first tape body being free from adhesive; a second tape body of an extensible material having a front surface, a rear surface, a first longitudinal side edge and a second longitudinal side edge;
the second tape body having an adhesive on the rear surface for attachment to the film when applied all over the first tape body;
the second tape body having a width arranged such that the second tape body when applied over the film at the first tape body bridges to each side of the filament on the first tape body underneath the film;
wherein the filament and the second tape body are arranged such that the filament when pulled tears through the second tape body along the length of the second tape body at its position at the second tape body spaced from both side edges.

2. The tape system according to claim 1 wherein the filament comprises a metal wire having a diameter in the range 0.0025 to 0.005.

3. The tape system according to claim 2 wherein the filament and the first tape body are arranged such that, with the rear surface of the first tape body attached to the object, the filament when pulled tears through the first substrate of the first tape body along the length of the first tape body at its position on the first tape body spaced from both side edges rather than pulling out from one side edge of the tape body.

4. The tape system according to claim 1 wherein the filament is attached to the first tape body at a position thereon spaced from both the first and second side edges which allows bending of the first tape body while the first tape body remains flat in a first side to side direction by extension of the first tape body along the second longitudinal side edge relative to the filament and to the first longitudinal side edge and in a second side to side direction by extension of the tape along the first longitudinal side edge relative to the filament and to the second longitudinal side edge.

5. The tape system according to claim 1 wherein each tape body has a width less than 0.25 inches.

6. The system according to claim 1 wherein the first tape body carries a single filament.

7. The tape system according to claim 1 wherein the first tape body carries more than one filament.

8. The tape system according to claim 1 wherein the first tape body is arranged for use in wrapping a surface of an object with a film carrying a pressure sensitive adhesive on one surface by which the film is to be attached to the object such that the filament can be pulled from the first tape body through that part of the film over the first tape body so as to cut the film and to form a cut edge of the film.

9. The tape system according to claim 1 wherein the first and second tape bodies are formed of the same material.

10. The tape system according to claim 1 wherein the second tape body has a length so that an end thereof extends beyond the first tape body and the film to engage the object and hold the film onto the object.

11. A method for cutting a film when applied by an adhesive to an object comprising:
applying first tape body to the object;
the first tape body comprising an extensible material having a front surface, a rear surface, a first longitudinal side edge and a second longitudinal side edge, the first tape body comprising a first and a second substrate;
the first substrate layer overlaying the second substrate, and laminated by an adhesive to the second substrate;
the first tape body having a longitudinally extending filament laminated between the first and second substrates and carried thereby;
the first tape body having an adhesive on the rear surface for attachment to the object;
the front surface of the first tape body being free from adhesive and having a release characteristic relative to the adhesive;
applying a second tape body over the film at the first tape body so as to bridge to each side of the filament of the first tape body underneath the film;
the second tape body comprising an extensible material having a front surface, a rear surface, a second longitudinal side edge and a second longitudinal side edge;
the second tape body having an adhesive on the rear surface for attachment to the film;
and pulling the filament so as to tear through the film and the second tape body along the length of the second tape body at its position on the second tape body spaced from both side edges.

12. The method according to claim 11 wherein the second tape body applies a force to the film acting to reduce tendency of the film to pull away from the object during the cutting by the filament as the filament is pulled.

13. The method according to claim 11 wherein the film is applied with an application of water to the object.

14. The method according to claim 11 wherein the film is a stone guard film.

15. The method according to claim 11 wherein the filament is attached to the first tape body at a position thereon spaced from both the first and second side edges which allows bending of the first tape body while the first tape body remains flat in a first side to side direction by extension of the first tape body along the second longitudinal side edge relative to the filament and to the first longitudinal side edge and in a second side to side direction by extension of the tape along the first longitudinal side edge relative to the filament and to the second longitudinal side edge.

16. The method according to claim 11 where in the filament and the first tape body are arranged such that, with the rear surface of the first tape body attached to the object, the filament when pulled tears through the first tape body along the length of the first tape body at its position on the first tape body spaced from both side edges rather than pulling out from one side edge of the tape body.

17. The method according to claim 11 wherein each tape body has a width less than 0.25 inches.

18. The method according to claim 11 where in the first and second tape bodies are formed of the same material.

19. The method according to claim 11 wherein the filament comprises a metal wire having a diameter in the range 0.0025 to 0.005 inch.

20. The method according to claim 11 wherein the second tape body is laid so as to extend beyond an end of the first tape body and an edge of the film to engage the object and hold the film onto the object.

* * * * *